United States Patent
Kuo

(10) Patent No.: US 9,690,098 B1
(45) Date of Patent: Jun. 27, 2017

(54) ADJUSTABLE REFLECTOR OF HEAD-UP DISPLAY AND HEAD-UP DISPLAY COMPRISING THE SAME

(71) Applicant: Shanghai XPT Technology Limited, Shanghai (CN)

(72) Inventor: Bou-Chen Kuo, Taipei (TW)

(73) Assignee: Shanghai XPT Technology Limited, Shanghai (CN)

( * ) Notice: Subject to any disclaimer, the term of this patent is extended or adjusted under 35 U.S.C. 154(b) by 0 days.

(21) Appl. No.: 15/361,077

(22) Filed: Nov. 25, 2016

(30) Foreign Application Priority Data

Sep. 27, 2016 (CN) .......................... 2016 1 0856279

(51) Int. Cl.
*G02B 15/14* (2006.01)
*G02B 27/01* (2006.01)
*G02B 27/00* (2006.01)

(52) U.S. Cl.
CPC ..... *G02B 27/0149* (2013.01); *G02B 27/0093* (2013.01); *G02B 27/0101* (2013.01); *G02B 2027/011* (2013.01); *G02B 2027/0154* (2013.01); *G02B 2027/0163* (2013.01)

(58) Field of Classification Search
USPC .................................................. 359/630–635
See application file for complete search history.

(56) References Cited

U.S. PATENT DOCUMENTS 4,188,090 A * 2/1980 Ellis ................... G02B 27/0101
359/632
6,157,291 A * 12/2000 Kuenster ............ G02B 27/0172
345/8

* cited by examiner

*Primary Examiner* — Mohammed Hasan
(74) *Attorney, Agent, or Firm* — Winston Hsu

(57) ABSTRACT

An adjustable reflector of a head-up display includes a base, an adjusting frame, a reflecting element and a control module. The adjusting frame has a first end and a second end opposite to the first end. The first end is pivoted to the base, and the second end is rotatable around the first end. The reflecting element is arranged on the adjusting frame for reflecting a light beam generated by an image source to an optical combiner. The control module includes a linkage arm and a driving unit. A first end of the linkage arm is slidably connected to the adjusting frame. The driving unit is connected to a second end of the linkage arm and configured to drive the linkage arm to rotate for adjusting an included angle between the adjusting frame and the base.

10 Claims, 8 Drawing Sheets

ADJUSTABLE REFLECTOR OF HEAD-UP DISPLAY AND HEAD-UP DISPLAY COMPRISING THE SAME

BACKGROUND OF THE INVENTION

1. Field of the Invention

The present invention relates to an adjustable reflector of a head-up display, and more particularly, to an adjustable reflector of a head-up display capable of improving image stability.

2. Description of the Prior Art

Please refer to FIG. 1. FIG. 1 is a diagram showing a head-up display of the prior art. Generally, the head-up display 100 of the prior art comprises an image source 110, a lens 120, a reflecting mirror 130 and an optical combiner 140. A light beam L generated by the image source 110 is refracted by lens 120, and then reflected to the optical combiner 140 by the reflecting mirror 130. The light beam L reflected to the optical combiner 140 forms a virtual image and/or a real image for providing driving information, such as vehicle speed information, time information and navigation information, to a driver. Since different drivers have different heights and seating positions, in order to allow the drivers to easily see the information displayed by the head-up display, a reflection angle of the reflecting mirror 130 can be adjusted to reflect the light beam L to an appropriate position on the optical combiner 140. For example, when the driver is shorter, the head-up display 100 can rotate the reflecting mirror 130 for moving an incident position of the light beam L from a first position P1 to a second position P2, which is a lower position, on the optical combiner 140. However, an imaging distance of the virtual image and/or the real image on the optical combiner 140 is related to a travelling distance of the light beam L from the lens 120 to the optical combiner 140, and a focal length of the lens 120 is fixed. When the incident position of the light beam L is moved from the first position P1 to the second position P2 on the optical combiner 140, the travelling distance of the light beam L from the reflecting mirror 130 to the optical combiner 140 becomes shorter (changed from a2 to a3), such that the imaging distance of the virtual image and/or the real image is changed, so as to affect image quality of the virtual image and/or the real image. Moreover, when the incident position of the light beam L is moved from the first position P1 to the second position P2 on the optical combiner 140, an incident angle of the light beam L is also changed, so as to further cause image distortion. Therefore, when the head-up display 100 of the prior art adjusts the reflection angle of the reflecting mirror 130, the head-up display 100 has lower image stability.

SUMMARY OF THE INVENTION

The present invention provides an adjustable reflector of a head-up display comprising a base, an adjusting frame, a reflecting element and a control module. The adjusting frame has a first end and a second end opposite to the first end. The first end is pivoted to the base, and the second end is rotatable around the first end. The reflecting element is arranged on the adjusting frame for reflecting a light beam generated by an image source of the head-up display to an optical combiner of the head-up display. The control module comprises a linkage arm and a driving unit. The linkage arm has a first end and a second end opposite to the first end, and the first end of the linkage arm is slidably connected to the adjusting frame. The driving unit is connected to the second end of the linkage arm and configured to drive the linkage arm to rotate for adjusting an included angle between the adjusting frame and the base.

The present invention further provides a head-up display comprising an image source, an optical combiner, and at least one adjustable reflector. The image source is configured to generate a light beam. The optical combiner is configured to display an image according to an incident light beam. The at least one adjustable reflector comprises a base, an adjusting frame, a reflecting element and a control module. The adjusting frame has a first end and a second end opposite to the first end. The first end is pivoted to the base, and the second end is rotatable around the first end. The reflecting element is arranged on the adjusting frame for reflecting the light beam generated by the image source to the optical combiner. The control module comprises a linkage arm and a driving unit. The linkage arm has a first end and a second end opposite to the first end, and the first end of the linkage arm is slidably connected to the adjusting frame. The driving unit is connected to the second end of the linkage arm and configured to drive the linkage arm to rotate for adjusting an included angle between the adjusting frame and the base.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
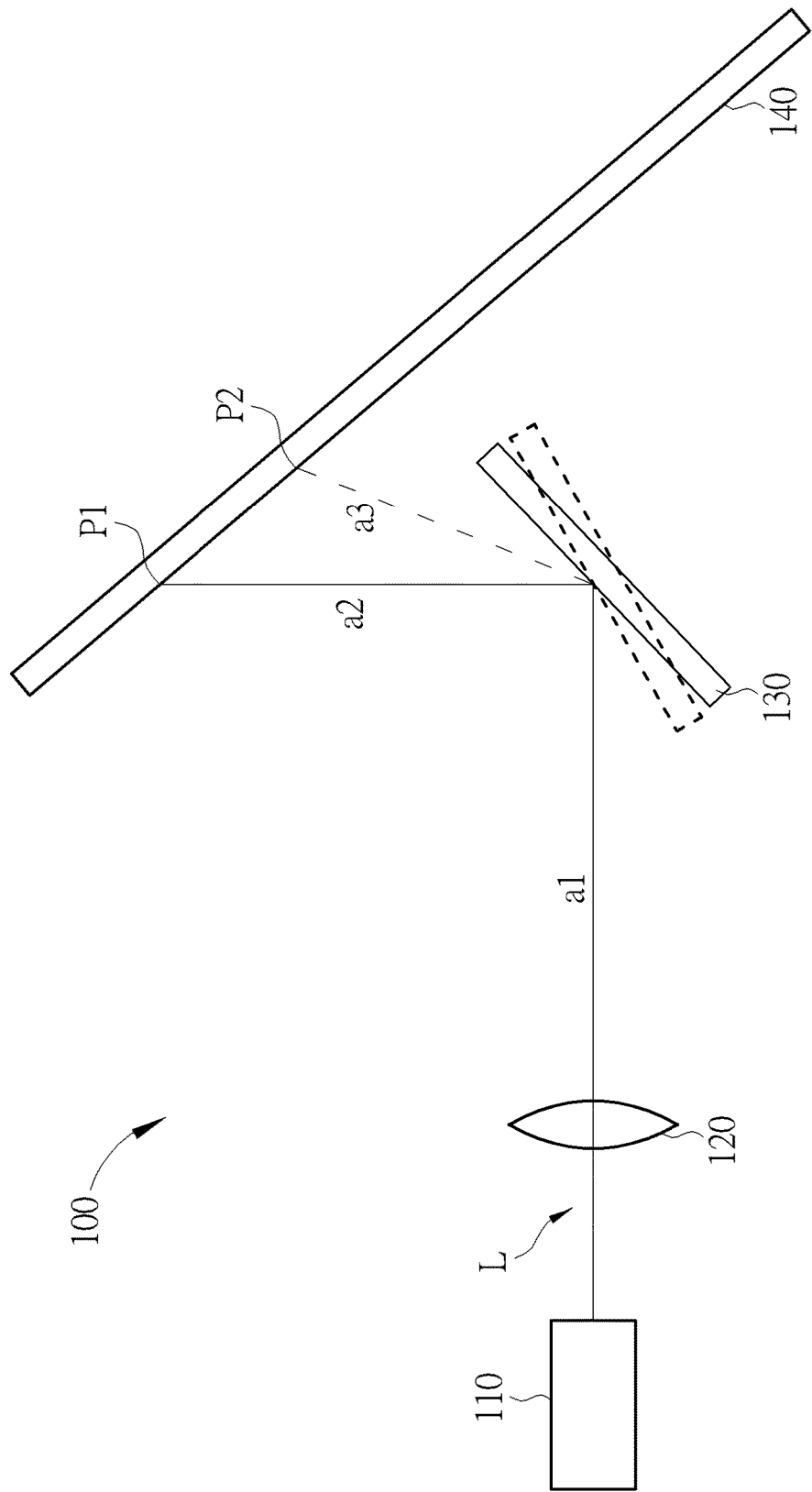
FIG. 1 is a diagram showing a head-up display of the prior art.
Figure 2:
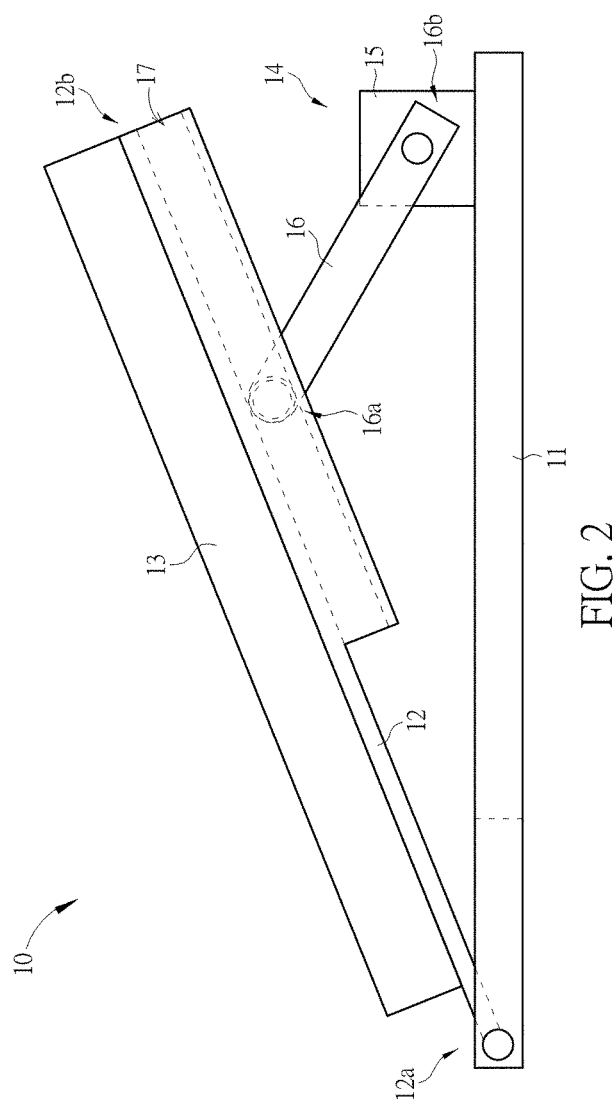
FIG. 2 is a diagram showing an adjustable reflector of the present invention.
Figure 3:
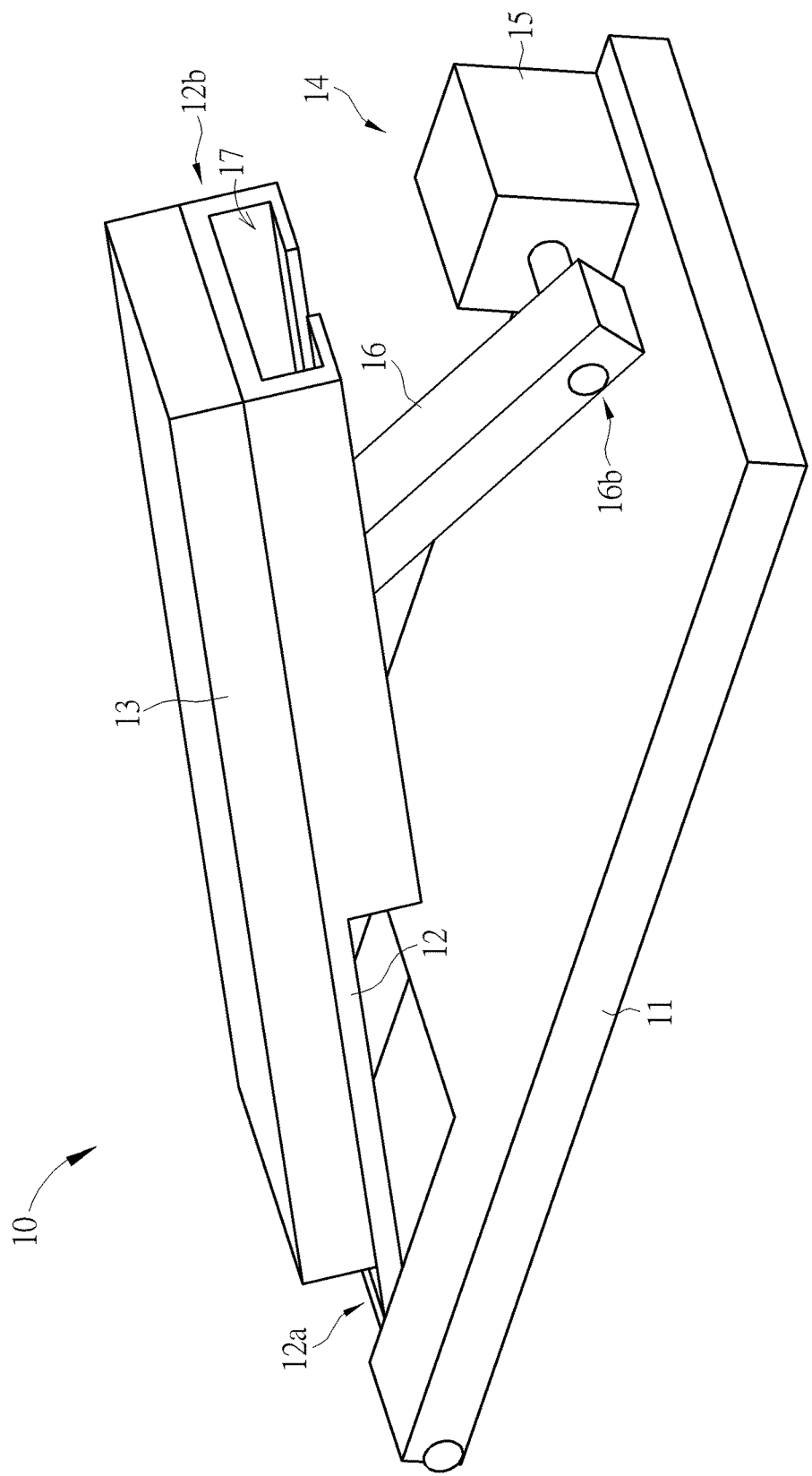
FIG. 3 is a diagram showing the adjustable reflector of FIG. 2 in another angle.

Please refer to FIG. 2 and FIG. 3. FIG. 2 is a diagram showing an adjustable reflector of the present invention. FIG. 3 is a diagram showing the adjustable reflector of FIG. 2 in another angle. As shown in figures, the adjustable reflector 10 of the present invention comprises a base 11, an adjusting frame 12, a reflecting element 13 and a control module 14. The adjusting frame 12 has a first end 12a and a second end 12b opposite to the first end 12a. The first end 12a of the adjusting frame 12 is pivoted to the base 11, and the second end 12b of the adjusting frame 12 is rotatable around the first end 12a. A guiding groove 17 is formed on the adjusting frame 12. The reflecting element 13 is arranged on the adjusting frame 12. The guiding groove 17 and the reflecting element 13 are respectively located on two opposite sides of the adjusting frame 12. The control module 14 comprises a linkage arm 16 and a driving unit 15. The linkage arm 16 has a first end 16a and a second end 16b opposite to the first end 16a. The first end 16a of the linkage arm 16 is accommodated in the guiding groove 17 and configured to slide along the guiding groove 17. In other words, the first end 16a of the linkage arm 16 is slidably connected to the adjusting frame 12. The driving unit 15 (e.g. a motor and related transmission mechanisms) is connected to the second end 16b of the linkage arm 16 and configured to drive the linkage arm 16 to rotate.

According to the above arrangement, when the driving unit 15 drives the linkage arm 16 to rotate, the linkage arm 16 further drives the adjusting frame 12 to rotate for changing an included angle between the adjusting frame 12 and the base 11, so as to change a reflection angle of the reflecting element 13. For example, when the driving unit 15 drives the linkage arm 16 to rotate clockwise, the included angle between the adjusting frame 12 and the base 11 is increased; and when the driving unit 15 drives the linkage arm 16 to rotate counterclockwise, the included angle between the adjusting frame 12 and the base 11 is decreased. On the other hand, the arrangement of the guiding groove 17 can allow the adjusting frame 12 to continuously contact the linkage arm 16, so as to prevent the adjusting frame 12 from shaking.

In the present embodiment, the reflecting element 13 is a plane mirror, but the present invention is not limited thereto. In other embodiments of the adjustable reflector of the present invention, the reflecting element 13 can be a curved mirror (such as a concave mirror). The adjustable reflector of the present invention can be arranged with an appropriate type of the reflecting element according to design requirements. In addition, the structure of the guiding groove 17 in FIG. 3 is shown for example, the present invention is not limited thereto. In the other embodiments of the adjustable reflector of the present invention, the guiding groove 17 can have a different structure. Moreover, both ends of the guiding groove 17 can be arranged with blocking structures for preventing the first end 16a of the linkage arm 16 from moving out of the guiding groove 17.

Figure 4:
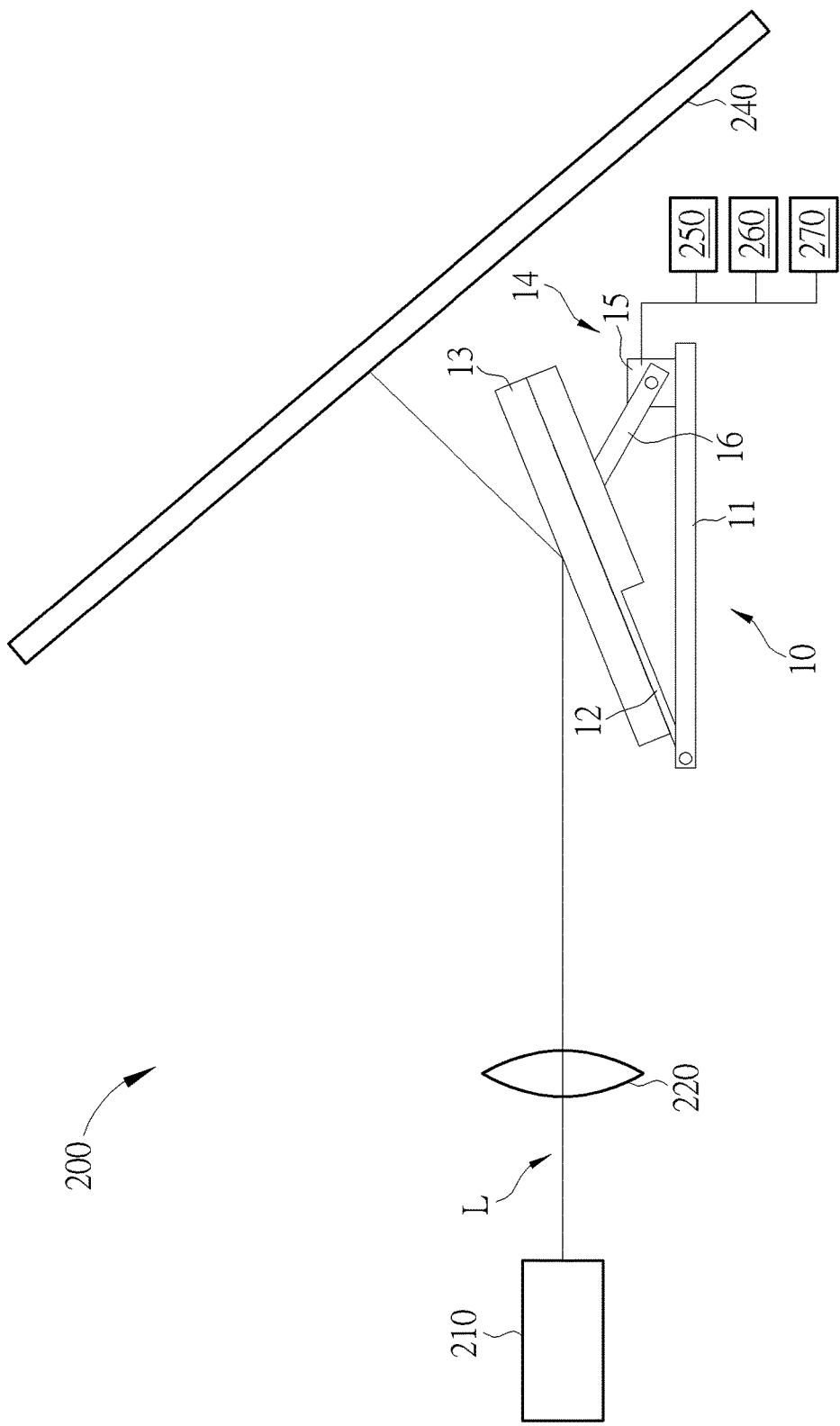
FIG. 4 is a diagram showing a head-up display according to a first embodiment of the present invention.

Please refer to FIG. 4. FIG. 4 is a diagram showing a head-up display according to a first embodiment of the present invention. As shown in FIG. 4, the head-up display 200 of the present invention comprises an image source 210, a lens 220, an adjustable reflector 10 and an optical combiner 240. The image source 210 is configured to generate a light beam L according to driving information, and a pattern of the light beam corresponds to the driving information, such as vehicle speed information, time information, and navigation information. The lens 220 is arranged between the image source 210 and the adjustable reflector 10 for refracting the light beam L generated by the image source 210. The adjustable reflector 10 is configured to reflect the light beam L passed through the lens 220 to the optical combiner 240. In the present embodiment, the reflecting element 13 of the adjustable reflector 10 is a plane mirror. When the adjustable reflector 10 reflects the light beam L to the optical combiner 240, the light beam L forms a virtual image and/or a real image on the optical combiner 240 for providing the driving information (e.g. the vehicle speed information, time information, and navigation information) to a driver. The virtual image and/or the real image on the optical combiner 240 overlaps a scene in front of the driver without affecting the driver's sight. On the other hand, the optical combiner 240 can be formed with a plurality of scattering units (e.g. convex structures) for scattering light, in order to further increase a viewing angle of the image on the optical combiner 240.

In addition, the head-up display 200 of the present invention can further comprise a gravity sensor 250 configured to sense the included angle between the head-up display 200 and a horizontal plane. The control module 14 can be further configured to adjust the included angle between the adjusting frame 12 and the base 11 according to a sensing result of the gravity sensor 250. For example, when a vehicle moves uphill, the driver's sight is lower. The control module 14 can adjust the included angle between the adjusting frame 12 and the base 11 according to the sensing result of the gravity sensor 250, in order to move an incident position of the light beam L on the optical combiner 240 downward. When the vehicle moves downhill, the driver's sight is higher. The control module 14 can adjust the included angle between the adjusting frame 12 and the base 11 according to the sensing result of the gravity sensor 250, in order to move the incident position of the light beam L on the optical combiner 240 upward.

Furthermore, the head-up display 200 of the present invention can further comprise an eyeball tracking sensor 260 configured to sense a relative position between the head-up display 200 and the driver. The control module 14 can be further configured to adjust the included angle between the adjusting frame 12 and the base 11 according to a sensing result of the eyeball tracking sensor 260. For example, when the driver is taller, the control module 14 can adjust the included angle between the adjusting frame 12 and the base 11 according to the sensing result of the eyeball tracking sensor 260, in order to move the incident position of the light beam L on the optical combiner 240 upward. When the driver is shorter, the control module 14 can adjust the included angle between the adjusting frame 12 and the base 11 according to the sensing result of the eyeball tracking sensor 260, in order to move the incident position of the light beam L on the optical combiner 240 downward.

On the other hand, the control module 14 can be electrically connected to a speedometer 270 of the vehicle for adjusting the included angle between the adjusting frame 12 and the base 11 according to a sensing result of the speedometer 270. For example, when the vehicle speed is greater, the driver looks at a farther place, such that the driver's sight is higher. The control module 14 can adjust the included angle between the adjusting frame 12 and the base 11 according to the sensing result of the speedometer 270, in order to move the incident position of the light beam L on the optical combiner 240 upward. When the vehicle speed is smaller, the driver looks at a nearer place, such that the driver's sight is lower. The control module 14 can adjust the included angle between the adjusting frame 12 and the base 11 according to the sensing result of the speedometer 270, in order to move the incident position of the light beam L on the optical combiner 240 downward.

Figure 5:
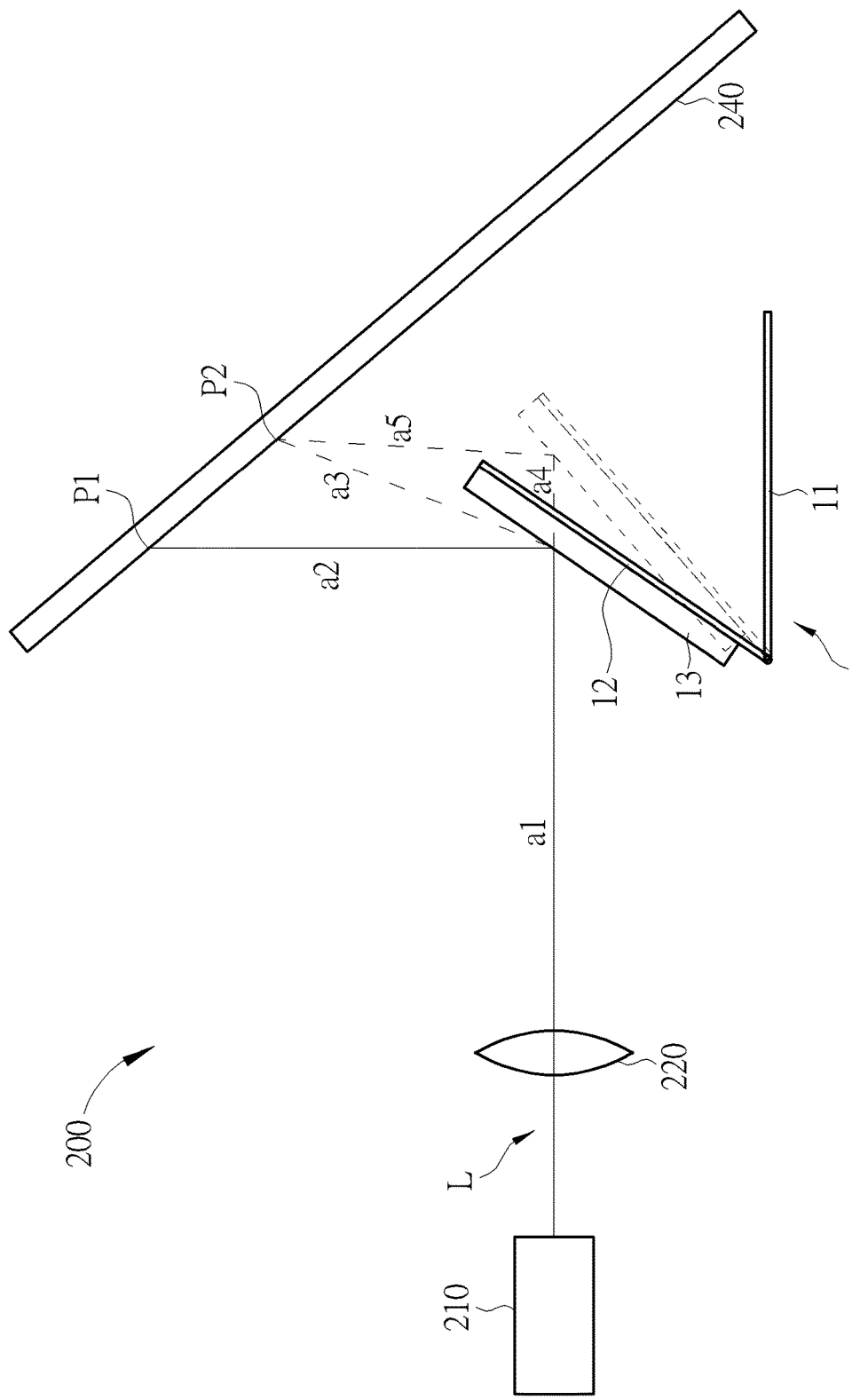
FIG. 5 is a diagram showing the head-up display of FIG. 4 adjusting the adjustable reflector adjusted.

Please refer to FIG. 5, and refer to FIG. 4 as well. FIG. 5 is a diagram showing the head-up display of FIG. 4 adjusting the adjustable reflector. For ease of illustration, some of the components of the head-up display of FIG. 4 are omitted in FIG. 5. When the reflecting element 13 reflects the light beam L to a first position P1 on the optical combiner 240, a travelling distance of the light beam L from the lens 220 to the optical combiner 240 is (a1+a2). When the head-up display 200 adjusts the adjustable reflector 10 for reflecting the light beam L to the second position P2 on the optical combiner 240, the travelling distance of the light beam L from the lens 220 to the optical combiner 240 is (a1+a4+a5). Comparing to the travel distance of the light beam (a1+a3) of the head-up display 100 of the prior art after rotating the reflecting mirror 130, the travelling distance of the light beam (a1+a4+a5) of the head-up display 200 of the present invention after adjustment is closer to the travel distance of the light beam (a1+a2) before adjustment. In other words, an imaging distance of the virtual image and/or the real image on the optical combiner 240 of the present invention is less affected by adjustment of the adjustable reflector 10. On the other hand, comparing to the incident angle of the light beam at the second position P2 on the optical combiner 240 of the head-up display of prior art, an incident angle of the light beam at the second position P2 on the optical combiner 240 of the head-up display 200 of the present invention is closer to the incident angle at the first position P1 on the optical combiner 240. In other words, distortion of the virtual image and/or the real image on the optical combiner 240 of the present invention, which is caused by change of the incident angle, is smaller.

Figure 6:
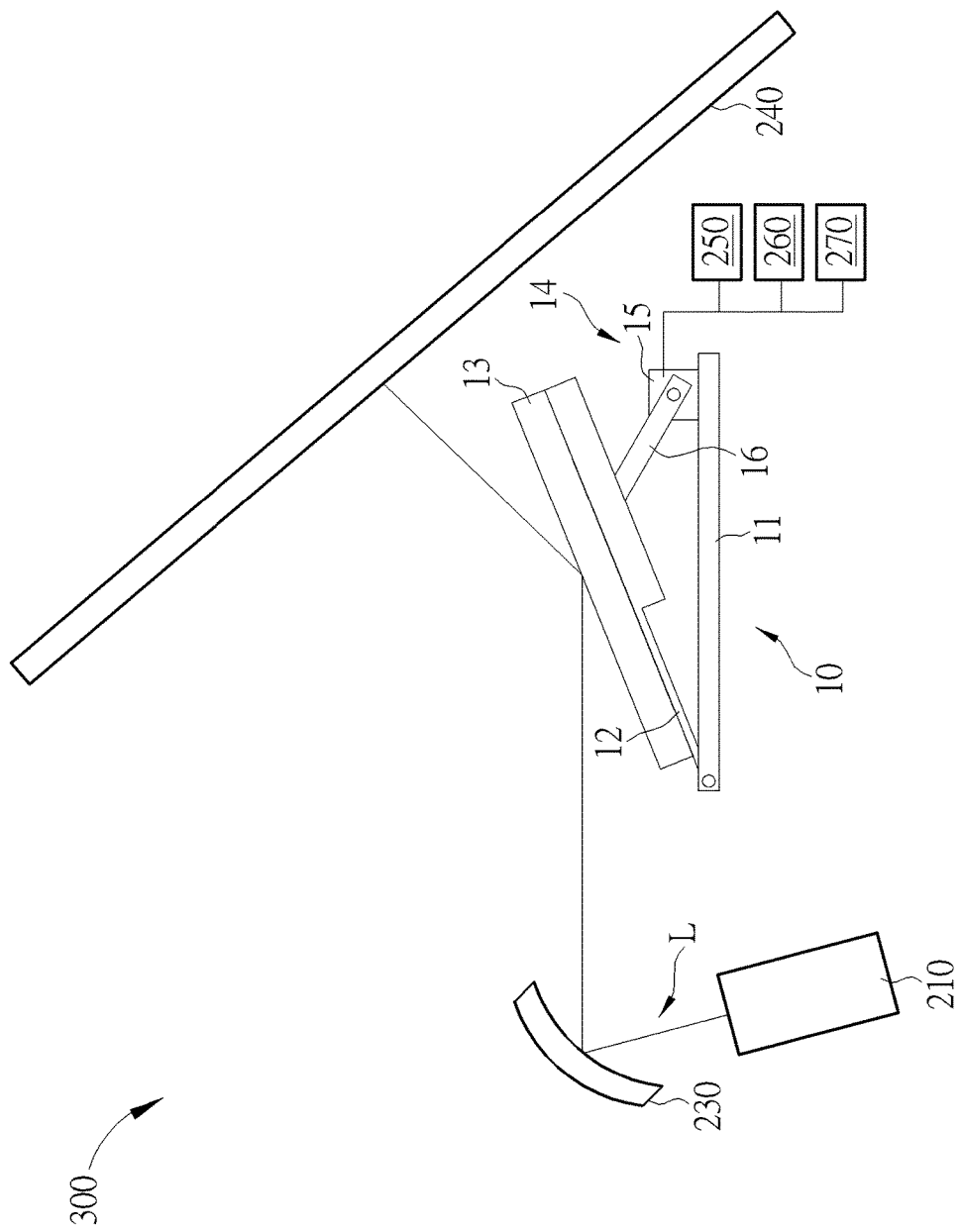
FIG. 6 is a diagram showing a head-up display according to a second embodiment of the present invention.

Please refer to FIG. 6. FIG. 6 is a diagram showing a head-up display according to a second embodiment of the present invention. In the embodiment of FIG. 6, the head-up display 300 utilizes a curved mirror 230 to replace the lens. The curved mirror 230 is configured to reflect the light beam L generated by the image source 210 to the reflecting element 13. The reflecting element 13 further reflects the light beam L to the optical combiner 240 for forming a virtual image and/or a real image. Since operation of the head-up display of the second embodiment of the present invention is similar to operation of the head-up display of the first embodiment of the present invention, no further illustration is provided.

Figure 7:
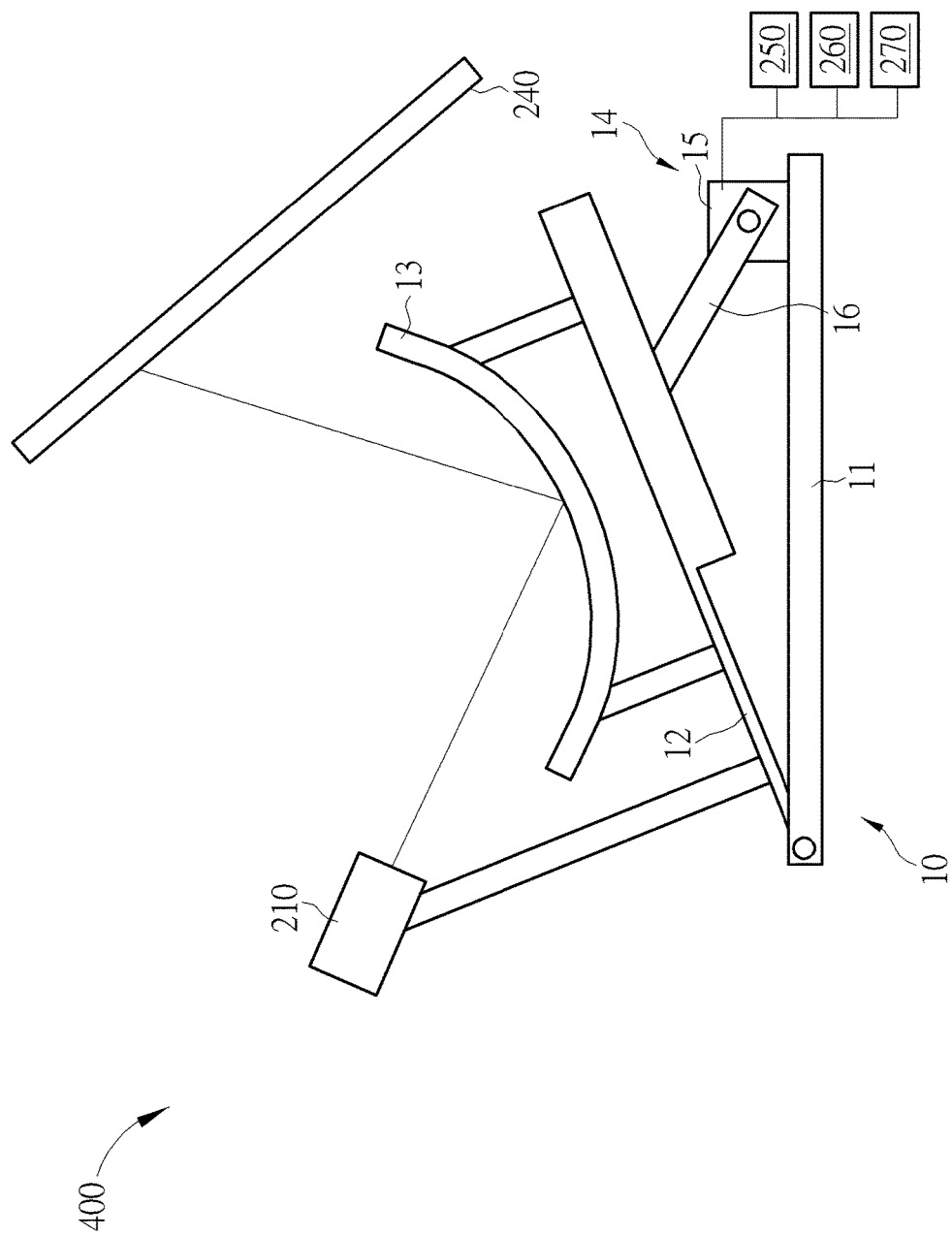
FIG. 7 is a diagram showing a head-up display according to a third embodiment of the present invention.

Please refer to FIG. 7. FIG. 7 is a diagram showing a head-up display according to a third embodiment of the present invention. In the embodiment of FIG. 7, the reflecting element 13 of the adjustable reflector 10 is a curved mirror. Since the curved mirror can reflect the light beam L generated by the image source 210 to the optical combiner 240 for directly forming a virtual image and/or a real image, the lens can be omitted. In addition, a distance between the curved mirror 13 and the image source 210 must be fixed, thus the image source 210 is configured to rotate along with the adjusting frame 12. For example, the image source 210 can be connected to the adjusting frame 12 for rotating along with the adjusting frame 12.

Figure 8:
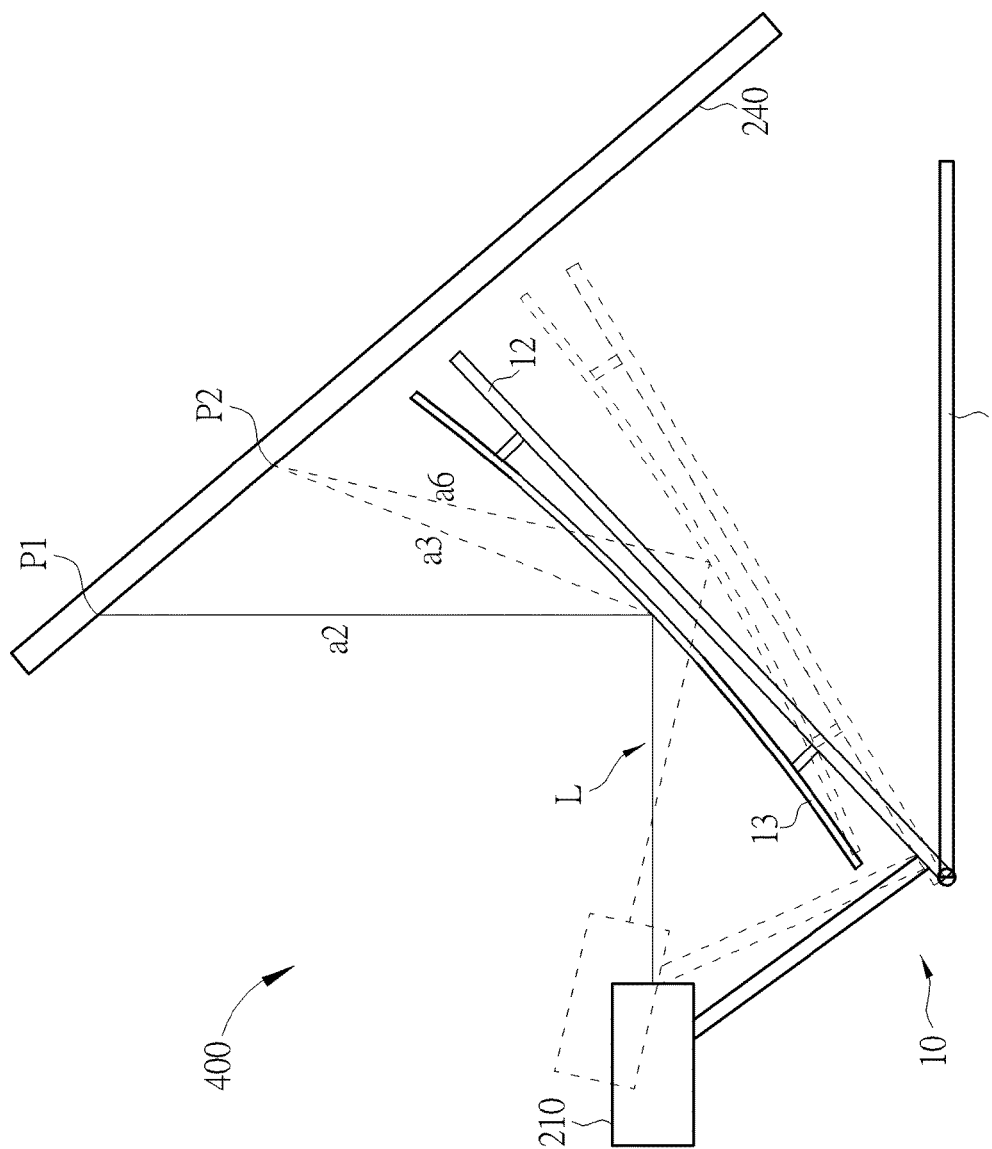
FIG. 8 is a diagram showing the head-up display of FIG. 7 adjusting the adjustable reflector.

Please refer to FIG. 8, and refer to FIG. 7 as well. FIG. 8 is a diagram showing the head-up display of FIG. 7 adjusting the adjustable reflector. For ease of illustration, some of the components of the head-up display of FIG. 7 are omitted in FIG. 8. In the present embodiment, the imaging distance of the virtual image and/or the real image on the optical combiner 240 is related to the travelling distance of the light beam L from the reflecting element 13 to the optical combiner 240, and a focal length of the reflecting element 13 is fixed. When the reflecting element 13 reflects the light beam L to the first position P1 on the optical combiner 240, the travelling distance of the light beam L from the reflecting element 13 to the optical combiner 240 is a2. When the head-up display 400 adjusts the adjustable reflector 10 for reflecting the light beam L to the second position P2 on the optical combiner 240, the travelling distance of the light beam L from the reflecting element 13 to the optical combiner 240 is a6. Comparing to the travelling distance of the light beam a3 of the head-up display of the prior art after rotating the reflecting element, the travelling distance of the light beam a6 of the head-up display 400 of the present invention after adjustment is closer to the travelling distance a2 of the light beam before adjustment. In other words, the imaging distance of the virtual image and/or the real image on the optical combiner 240 of the present invention is less affected by adjustment of the adjustable reflector 10. On the other hand, comparing to the incident angle of the light beam at the second position P2 on the optical combiner 240 of the head-up display of the prior art, the incident angle of the light beam at the second position P2 on the optical combiner 240 of the head-up display 200 of the present invention is closer to the incident angle at the first position P1 on the optical combiner. In other words, distortion of the virtual image and/or the real image on the optical combiner 240 of the present invention, which is caused by change of the incident angle, is smaller.

In FIG. 4 to FIG. 8, the arrangements of the head-up display of the present invention are shown for example, the present invention is not limited thereto. In the other embodiments of the present invention, positions, angles and quantities of the image source 210, the lens 220, the curved mirror 230, the adjustable reflector 10 and the optical combiner 240 can be changed according to design requirements. For example, in addition to placing the base 11 of the adjustable reflector 10 horizontally, the base 11 of the adjustable reflector 10 can also be placed vertically or obliquely.

In contrast to the prior art, when the head-up display of the present invention adjusts the adjustable reflector, the change of the travelling distance of the light beam is smaller, such that the change of the imaging distance of the virtual image and/or the real image on the optical combiner is smaller. Furthermore, the change of the incident angle of the light beam on the optical combiner is also smaller, such that the distortion of the virtual image and/or the real image on the optical combiner is smaller. Therefore, the adjustable reflector of the present invention can improve the image stability of the head-up display.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A head-up display, comprising:
   an image source configured to generate a light beam;
   an optical combiner configured to display an image according to an incident light beam; and
   at least one adjustable reflector comprising:
   a base;
   an adjusting frame having a first end and a second end opposite to the first end, the first end being pivoted to the base, the second end being rotatable around the first end;
   a reflecting element arranged on the adjusting frame for reflecting the light beam generated by the image source to the optical combiner; and
   a control module, comprising:
   a linkage arm having a first end and a second end opposite to the first end, the first end of the linkage arm being slidably connected to the adjusting frame; and
   a driving unit connected to the second end of the linkage arm and configured to drive the linkage arm to rotate for adjusting an included angle between the adjusting frame and the base.

2. The head-up display of claim 1, wherein a guiding groove is formed on the adjusting frame, and the first end of the linkage arm is slidable along the guiding groove.

3. The head-up display of claim 2, wherein the guiding groove and the reflecting element are respectively located on two opposite sides of the adjusting frame.

4. The head-up display of claim 1, wherein the reflecting element is a curved mirror.

5. The head-up display of claim 1, wherein the reflecting element is a plane mirror.

6. The head-up display of claim 5, further comprising a curved mirror configured to reflect the light beam generated by the image source to the reflecting element.

7. The head-up display of claim 5, further comprising a lens arranged between the image source and the reflecting element for refracting the light beam generated by the image source.

8. The head-up display of claim 1, further comprising a gravity sensor configured to sense an included angle between the head-up display and a horizontal plane, wherein the control module is further configured to adjust the included angle between the adjusting frame and the base according to a sensing result of the gravity sensor.

9. The head-up display of claim 1, further comprising an eyeball tracking sensor configured to sense a relative position between the head-up display and a user, wherein the control module is further configured to adjust the included angle between the adjusting frame and the base according to a sensing result of the eyeball tracking sensor.

10. The head-up display of claim 1, wherein the control module is electrically connected to a speedometer of a vehicle for adjusting the included angle between the adjusting frame and the base according to a sensing result of the speedometer.

\* \* \* \* \*